United States Patent Office 3,458,119
Patented July 29, 1969

3,458,119
BLADES FOR FLUID FLOW MACHINES
Harry Shaw, Aldershot, England, assignor to Minister of Technology in Her Britannic Majesty's Government of the United Kingdom of Great Britain and Northern Ireland, London, England
Filed Aug. 28, 1967, Ser. No. 663,753
Claims priority, application Great Britain, Aug. 26, 1966, 38,310/66
Int. Cl. F04d 29/26
U.S. Cl. 230—134        6 Claims

ABSTRACT OF THE DISCLOSURE

In an axial flow compressor blade, the root proper is connected to the platform by a waisted portion, or root extension. The root extenseion is tapered inwardly from front to rear in plan view and is cut short (i.e., undercut) at the rear relative to the root and platform. The platform is inclined upwardly from front to rear to accommodate the flare of the blade which results in the root extension increasing in depth towards the rear with increased overall flexibility in this area helping to relieve stresses occurring in the blade trailing edge. The platform is tapered in thickness for the same reason.

---

The blade is intended to be mounted in a rotor disc of part conical section where the root gashings fit closely around the root proper but with limited clearance around the root extension. The platform is a sliding fit in the disc to permit it a limited twist about a fore and aft axis.

The invention relates to blades and bladed rotors for axial fluid flow machines, particularly compressors.

A conventional blade comprises a working portion of aerofoil shape smoothly faired at one end into a platform which forms part of a root. The blade is mounted in a carrier consisting of a relatively massive disc having a suitable recess in which the blade root is secured. A bladed rotor usually consists of one or more discs each carrying a plurality of radially directed blades uniformly arranged round its periphery. The platform of each blade closes the disc recess in which the blade is secured and the upper surface of the platform, that is the surface adjacent the working portion, forms with the platforms of adjacent blades, or with the peripheral surfaces of the disc on each side of the recess, one wall of a fluid passage.

The bladed rotor is mounted on a shaft for rotating in a stationary casing the inner surface of which forms the other wall of the fluid passage. Stator blades extend inwardly from the walls of the casing and are arranged in rings which interleave with the rings of blades on the rotor. The annular space between the surface of the rotor and the inner surface of the casing progressively reduces in cross-section from one end of the rotor to the other, the direction of reduction depending upon whether the rotor is a compressor rotor or a turbine rotor. With a compressor rotor, for example, the cross-section reduces from inlet to outlet, i.e. in a downstream direction, and thus the blades of each ring become progressively smaller as the outlet is approached. Further, in each ring the trailing or downstream edges of the blades are shorter than the leading or upstream edges and the platforms of the rotor and stator blades are inclined towards each other.

When a bladed rotor is rotating at high speed, large centrifugal and fluid loads are applied to each blade which consequently has a substantial and relatively inflexible root to transmit the loads to the carrying disc. It is not generally practical, however, for aerodynamic and centrifugal loading reasons to make the working portion of the blade as substantial as the root and where the heavily loaded but relatively weak working portion is faired into the platform of the inflexible root, very high tensile stresses are developed. These stresses may, in some circumstances, become so high that a fracture occurs at the trailing edge of the working portion, which is the thinnest and weakest part of the blade.

While the fluid loads can be considered basically as acting tangentially and axially with respect to the rotor disc to produce bending of the working portion in the direction of the loads, other loads are applied which produce different deformations of the working portion.

The fluid load includes the "lift" force produced by the flow of fluid over the working portions of the blade. The lift force on any transverse section of the working portion can be considered as acting at a point known as the centre of lift and an imaginary line extending lengthwise of the working portion can be drawn through the centres of lift of all the sections constituting the working portion. This line is usually known as the "lift axis." If the lift axis coincides with the longitudinal axis, usually called the "torsional flexural axis," about which the working portion tends to twist no torsional force will be applied to the working portion. Generally, however, the lift axis is located nearer the leading edge of the working portion than is the flexural axis so that the lift force is tending to twist the working portion in a sense to increase its incidence. At rotor speeds near the design maximum the incidence of the working portion is close to stalling incidence. If now there is a disturbance in the flow of fluid over the working portion the incidence may increase until stall is reached when the lift falls off. With a fall in lift the incidence of the working portion reduces until lift is regained and commences once more to increase the incidence. An unstable flow pattern is induced which results in "flutter" of the working portion of the blade. Since at any given speed of rotation of the rotor the velocity of the fluid flow over a blade increases wih increasing distance from the axis of rotation, and since the working portion of a blade is more flexible towards the tip, i.e. the radially outermost part, it will be seen that the tip is even more susceptible to fluid flow conditions tending to induce stall and flutter. The working portion of the blade is thus subjected to torsional forces which are for the most part constant but which, in some circumstances, may fluctuate causing the working portion to oscillate about its flexural axis. These torsional forces produce a considerable increase in the stresses the working portion already has to bear and contribute materially to the tendency of blades to fail adjacent the junction of the trailing edge of the working portion with the platform.

According to the present invention a bladed rotor for a fluid flow machine comprises a blade having a root and an integral working portion, the root having a substantially rigid part and a relatively flexible trailing edge part capable of flexing with the trailing edge of the working portion and a blade carrier having a peripheral recess to receive the blade root and retain the blade against axial or radial movement and having means to damp the flexing of the flexible trailing edge part of the root.

Preferably the root extension includes a platform having a part overhanging the substantially rigid part of the root extension and capable of flexing with the trailing edge of the working portion, the platform and the blade receiving recess of the blade carrier being shaped and dimensioned so that the platform closes the recess and each side wall of the platform is in engagement with the associated side wall of the recess whereby flexing of the overhanging part of the platform is damped.

The invention will now be described, by way of example reference being made to the accompanying drawings, in which.

Figure 2:
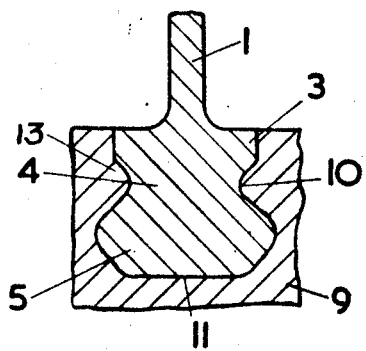
FIGURES 2 and 3 are sections of the blade of FIGURE 1 taken on the lines II—II and III—III and show, in section a part of a rotor disc.
Figure 3:
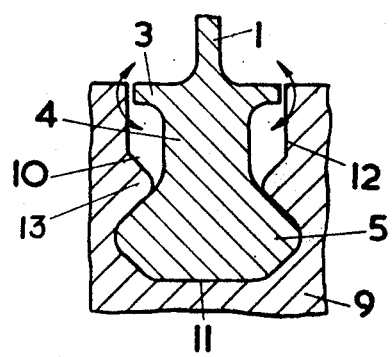

The compressor blade comprises a working portion 1 of aerofoil shape and a root 2. As can best be seen in FIGURES 2 and 3, the working portion is faired smoothly into an integral platform 3 forming part of a root extension 4. The root extension 4 terminates in a bulbous end 5 of substantially uniform cross-section constituting the root proper by which the blade is secured to a carrier.

The root extension 4 is partly cut away at its trailing or downstream edge (on the right of FIGURE 1) so as to provide a downstream axially extending portion which is substantially rigid and terminates short of the trailing edge of the blade working portion 1, and a relatively flexible overhanging part 6 which supports the trailing edge of the working portion so that the latter projects axially downstream over the rigid part of the root extension.

Figure 4:
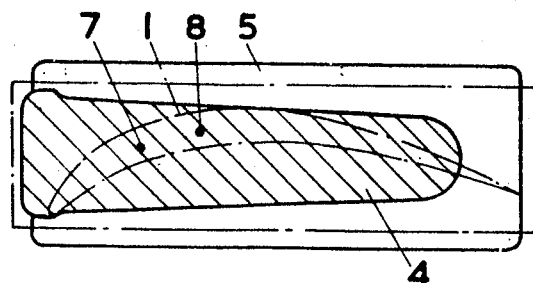
FIGURE 4 is a transverse section of the blade of FIGURE 1 taken on the line IV—IV.

As can best be seen from FIGURE 4, the downstream axially extending portion of the rotor extension 4 decreases in thickness from its edge to its trailing edge so that it has a uniformly tapering shape in a downstream direction.

As is in conventional blade the working portion 1 is not symmetrically disposed relative to the blade root 2, the trailing edge of the working portion 1 being to one side of the line of symmetry as is shown in broken lines on FIGURE 4. The lift axis 7 and the flexural axis 8 are also shown on this figure in the approximate positions they would be found in a conventional blade.

When a blade as described is in use the stresses developed in the trailing edge of the working portion 1 are relieved by flexing of the overhanging part 6 of the root extension 4. For example, if the working portion 1 is subjected to axially directed forces causing the trailing edge of the working section to bend forward or backward, the overhanging part 6 will also bend upward or downward to relieve some of the stress at the junction of the trailing edge of the working portion 1 with the platform 3. Similarly, if the forces applied to the working portion 1 are tangential or torsional the overhanging part 6 of the root extension 4 will tend to twist about an axis parallel with that of the root, as indicated by the arrows in FIGURE 3. Normally, there will be a combination of forces acting on the working portion 1 and the overhanging part 6 of the root extension 4 will both bend and twist to relieve the stresses in the trailing edge of the working portion 1.

Figure 1:
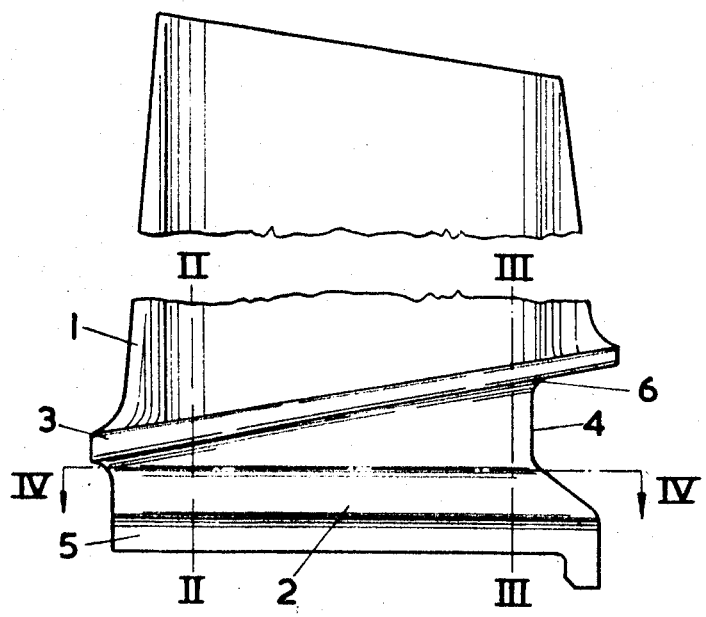
FIGURE 1 is a side elevation of a compressor blade according to the invention.

The flexibility of the overhanging part 6 of the root extension 4 is further enhanced by the platform 3 being reduced in depth towards the trailing edge as shown in FIGURE 1.

The depth of the root extension relative to its thickness in the region that is cut away to form the overhanging part gives a section having such a degree of flexibility that no pronounced stress gradient will be set up between the overhanging part and the rest of the root extension, or between the trailing edge of the working portion and the root.

Since the flexibility of the trailing edge of a blade is determined largely by the flexibility of the root the flexural axis of a blade as described above is nearer the blade leading edge than in a conventional blade. Further, the flexural axis is inclined towards the leading edge instead of being substantially parallel to the leading edge and it is possible that the flexural axis in some blades of this design will be in front of the lift axis toward the tip of the working section. Lift forces acting at the tip of such a blade would then act in a sense to reduce incidence instead of, as is normally the case, increasing incidence and the tendency for stall to occur at the blade tip would also be reduced.

A rotor disc, or blade carrier, 9 is frusto-conical and is formed with a plurality of axially extending recesses or slots 10 uniformly spaced round its periphery. Each recess 10 has an enlarged base channel 11 of suitable dimensions to receive the bulbous end 5 of the blade root 2 and a pair of opposed axial ribs 13, one on each side of the recess, which retain the blade root against radial movement. The blade root 2 may be held against axial movement by any well known means. The side walls 12 of each recess 10 extend radially outwardly from the ribs 13 parallel to each other and there is thus a progressively increasing clearance in a downstream direction between said side walls and the adjacent side walls of the downstream axially extending portion of the respective root extension 4 due to the taper of the latter which will accommodate flexing of the root extension. The spacing between the side walls of the recess 10 and the root extension at the leading edge is made as small as possible to prevent leakage of the fluid past the root extension whilst still permitting some relative movement. The top or radially outer part of the recess 10 and the platform 3 are dimensioned so that when a blade is located in the recess, the platform 3 closes the recess and the upper surface of the platform forms a smooth continuation of the surface of the disc 9 on each side of the recess 10. Each side wall of the platform 3 is preferably in rubbing contact with the adjacent side wall of the recess, particularly at and towards the trailing edge, to provide friction damping to the flexing of the overhanging part 6 of the root extension 4.

I claim:

1. A bladed rotor for an axial flow machine in which normally rigid blades are adapted to flex at the trailing edges thereof for relieving stresses occurring at the trailing edges under operating conditions, said rotor comprising a disc having a plurality of axially extending slots in the periphery thereof, each of said slots having an enlarged base portion terminating in a pair of opposed axial ribs one on each side of the slot, and a side wall extending radially outwardly from each rib, a blade extending outwardly from each slot, each of said blades having an integrally formed root, root extension and working portion, each said blade working portion having axially spaced leading and trailing edges, the root and root extension of each blade fitting the entire upstream portion of the rotor blade slot, said root extension having a downstream axially extending portion of reducing cross-section and terminating short of the trailing edge of the blade working portion so that the trailing edge of the blade working portion projects axially downstream thereover, the downstream axially extending portion of said root extension having a clearance space with the outwardly extending side walls of the rotor blade slot, whereby the downstream trailing portion of the blade working portion is rendered more flexible than the upstream leading portion of the blade working portion when the bladed rotor is subject to fluid flow therethrough.

2. A bladed rotor according to claim 1 in which the root extensions each include a platform extending from adjacent the leading edge to adjacent the trailing edge of the respective working portion.

3. A bladed rotor according to claim 2 in which the platforms and slots are so shaped and dimensioned that the platforms effectively close the slots at the periphery of the blade carrier and are in frictional engagement with the side walls of the slots.

4. A bladed rotor according to claim 3 in which the platforms are in rubbing contact with the side walls of the slots.

5. A bladed rotor according to claim 2 in which a portion of each root extension between the platform and the root decreases in thickness from its leading edge to its trailing edge and the side walls of each slot are substantially parallel.

6. A bladed rotor for an axial flow compressor having a plurality of normally rigid blades adapted to flex at the trailing edges thereof for relieving stresses occurring at the trialing edges under operating conditions, said rotor comprising a blade carrying disc having a plurality of axially extending slots in the periphery thereof, each of said slots having an enlarged base channel, a pair of opposed axial ribs, one on each side of the slot, at the radially outer part of the base channel, and a side wall extending radially outwardly from each rib to the periphery of the disc, a blade extending radially outwardly from each slot, each of said blades having an integrally formed root, root extension and working portion, each said blade working portion having axially spaced leading and trailing edges, the root of each blade being retained in the base channel of the blade rotor slot by said opposed axial ribs, the root and root extension of each blade fitting substantially the entire leading portion of said slot including the radially outer part thereof bounded by said side walls, the root extension of each blade having an axially extending portion of decreasing thickness in a downstream direction and terminating short of the trailing edge of the blade working portion so that the trailing edge of the blade working portion projects axially downstream thereover, the downstream axially extending portion of said root extension having a clearance space with the outwardly extending side walls of the rotor blade slot, whereby the downstream trailing portion of the blade working portion is rendered more flexible than the upstream leading portion of the blade working portion when the bladed rotor is subject to fluid flow therethrough.

References Cited

UNITED STATES PATENTS 2,660,400  11/1953  Griffith _____ 253—77.4

HENRY F. RADUAZO, Primary Examiner

U.S. Cl. X.R.

253—77